(12) United States Patent
Canti et al.

(10) Patent No.: US 11,478,959 B2
(45) Date of Patent: Oct. 25, 2022

(54) METHOD FOR PRODUCING A METAL MACHINING TOOL AND METAL MACHINING TOOL PRODUCED THEREBY

(71) Applicant: AUDI AG, Ingolstadt (DE)

(72) Inventors: Robert Canti, Munich (DE); Stefan Sanhieter, Langenmosen (DE); Christian Disch, Ingolstadt (DE); Johannes Noneder, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 754 days.

(21) Appl. No.: 16/318,159

(22) PCT Filed: Jun. 27, 2017

(86) PCT No.: PCT/EP2017/000754
§ 371 (c)(1),
(2) Date: Jan. 16, 2019

(87) PCT Pub. No.: WO2018/014989
PCT Pub. Date: Jan. 25, 2018

(65) Prior Publication Data
US 2019/0283104 A1   Sep. 19, 2019

(30) Foreign Application Priority Data
Jul. 21, 2016 (DE) .................... 10 2016 213 375.6

(51) Int. Cl.
*B29C 39/10* (2006.01)
*B29C 39/02* (2006.01)
(Continued)

(52) U.S. Cl.
CPC ............ *B29C 39/021* (2013.01); *B21D 37/20* (2013.01); *B23P 15/24* (2013.01); *B29C 39/10* (2013.01); *B29L 2031/757* (2013.01)

(58) Field of Classification Search
CPC . B29C 39/021; B29C 39/10; B29C 2033/385; B29L 2031/757; B21D 26/031; B21D 37/01; B21D 37/38
(Continued)

(56) References Cited

U.S. PATENT DOCUMENTS

| 2005/0034504 A1 | 2/2005 | Alaoui et al. |
| 2005/0044925 A1 | 3/2005 | Alaoui et al. |
| 2006/0014881 A1 | 1/2006 | Alaoui et al. |

FOREIGN PATENT DOCUMENTS

| CN | 1182667 A | 5/1998 |
| CN | 102481627 A | 5/2012 |

(Continued)

OTHER PUBLICATIONS

Chinese Office Action dated Jul. 24, 2020, in connection with corresponding CN Application No. 201780044656.5 (12 pp., including machine-generated English translation).

(Continued)

*Primary Examiner* — Jeffrey M Wollschlager
*Assistant Examiner* — Xue H Liu
(74) *Attorney, Agent, or Firm* — Maier & Maier, PLLC (57) ABSTRACT

A method for producing a first mold element for a metal machining tool, wherein the first mold element is configured as a holding-down mechanism, for producing the first mold element, a main body made of plastics material is provided, wherein a surface of the main body is subdivided into a plurality of regions, on at least one region of the surface of the main body, at least one casting mold is arranged, wherein the at least one casting mold and the at least one region of the surface enclose at least one cavity, which forms a negative mold for a layer of plastics material to be applied, wherein plastics material is filled into the at least one cavity and cured, wherein the plastics material in the at least one (Continued)

region is connected to the surface of the main body and applied to it, forming the layer.

9 Claims, 4 Drawing Sheets

(51) Int. Cl.
   *B21D 37/20* (2006.01)
   *B23P 15/24* (2006.01)
   *B29L 31/00* (2006.01)
(58) Field of Classification Search
   USPC .......................................................... 264/241
   See application file for complete search history.

(56) References Cited

FOREIGN PATENT DOCUMENTS

| | | | |
|---|---|---|---|
| CN | 102883834 | A | 1/2013 |
| DE | 69001890 | T2 | 12/1993 |
| DE | 10155233 | A1 | 5/2003 |
| DE | 10155234 | A1 | 5/2003 |
| DE | 10231001 | A1 | 2/2004 |
| EP | 1448325 | A1 | 8/2004 |

OTHER PUBLICATIONS

International Preliminary Report on Patentability with English-language translation of Written Opinion dated Jan. 31, 2019 in corresponding International Application No. PCT/EP2017/000754; 9 pages.
Chinese Office Action dated Nov. 21, 2019, in connection with CN Application No. 201780044656.5 (13 pgs., including machine-generated English translation).
Examination Report dated Apr. 20, 2017 of corresponding German application No. 10 2016 213 375.6; 11 pages.
International Search Report and Written Opinion dated Sep. 19, 2017 of corresponding International application No. PCT/EP2017/000754; 29 pages.
Frank, C.: "Kunststoff als Werkzeugwerkstoff für das Tietziehen von Feinblechen", 1999, including English abstsract; 134 pgs.
Deiler, G., Lobemeier, J.: "Tiefziehwerkzeuge aus Kunststoff— ideal für mittlere Serien" (Blech InForm Jan. 2003, S. 42-44), including English abstract; 4 pgs.
Deiler, G., Schweiker, T.: "Kunststoff senkt die Kosten im Kleinserien-Karosseriebau" (Blech InForm Apr. 2005, S. 36-40), including English abstract; 6 pgs.
Deiler, G.: "Untersuchungen zum Eignungsprofil polymerer Werkzeugwerkstoffe für das Tiefziehen von Feinblechen" (Berichte aus dem IFUM, Band: May 2005), including English abstract; 2 pgs.

METHOD FOR PRODUCING A METAL MACHINING TOOL AND METAL MACHINING TOOL PRODUCED THEREBY

FIELD

The invention relates to a method for producing a metal machining tool as well as to a metal machining tool.

BACKGROUND

Used for forming a structural part from sheet metal is a forming die, which has two mold parts that are complementary in form to each other. For this purpose, the structural part made of sheet metal is arranged between the two mold parts. The two mold parts are then forced against each other, whereby the structural part is pressed between the two mold parts and formed.

The publication DE 101 55 234 A1 describes a forming die, which, for example, is utilized for the deep drawing of metal parts. In this case, the forming die comprises a subregion that is composed of a plastics material in which a material having anti-friction properties is embedded.

The publication DE 102 31 001 A1 describes a die that, at least partially, is composed of plastics material that contains a proportion of nanoscale particles embedded in the plastic. This die is provided for the deep drawing of sheet metal for a chassis component of an automobile.

Further known from the publication DE 69 001 890 T2 is a method for molding a cut sheet metal blank for producing a mask for a cathode ray tube.

In addition, reference is made to the publications of Frank, C.: Kunststoff als Werkzeugwerkstoff für das Tiefziehen von Feinblechen [Plastics material as mold material for the deep drawing of thin sheet metals], 1999, of Deiler, G. and Lobemeier, J.: Tiefziehwerkzeuge aus Kunststoff—ideal für mittlere Serien [Deep drawing dies made of plastics material—ideal for medium-sized series] (Blech InForm January 2003, pp. 42-44), of Deiler, G. and Schweiker, T.: Kunststoff senkt die Kosten im Kleinserien-Karosseriebau [Plastics material lowers the costs in small-series chassis manufacture] (Blech InForm April 2005, pp. 36-40), and of Deiler, G.: Untersuchungen zum Eignungsprofil polymerer Werkzeugwerkstoffe für das Tiefziehen von Feinblechen [Investigations on the suitability profile of polymeric die materials for the deep drawing of thin sheet metals] (Berichte aus dem IFUM [Report from the IFUM], Volume: 05/2005).

Against this background, a method and a metal machining tool having the features of the independent patent claims is presented. Embodiments of the method and of the tool ensue from the dependent patent claims and from the description.

SUMMARY

The method according to the invention is provided for producing a metal machining tool, usually for producing at least one first mold element of the metal machining tool. For the production of the first mold element, an original main body made of plastics material is provided, wherein a surface of the main body is smooth and flat at least in sections and is subdivided into a plurality of regions. At least one casting mold is arranged at and/or on at least one region of the plurality of regions of the surface of the main body, wherein the at least one casting mold and the at least one region of the surface enclose at least one cavity, which forms a negative mold for a layer of plastics material to be applied onto the at least one region. Plastics material is filled into the at least one cavity and cured, wherein the plastics material is connected to the surface of the main body at the at least one region and is applied thereto, forming the layer. The produced first mold element is configured as a holding-down means for the metal machining tool and/or is to be referred to as such.

At and/or on the at least one region of the original surface of the main body is applied at least one other type of plastics material, which has at least one material property. The main body is composed of at least one type of plastics material having at least one material property. In this case, it is possible for the main body and the at least one layer to use different types of plastics material having different material properties.

In one embodiment, plastics material—usually two kinds or types of plastics material that differ from each other in terms of at least one material property—is or are applied on at least two different regions or sections of the surface of the main body. In accordance therewith, it is conceivable that, on a first region of the surface, a first type of plastics material is applied and, on a second region of the surface, a second type of plastics material is applied, and, on at least one other third region of the surface, at least one third type of plastics material is applied. In this case, at least two such types or kinds of plastics material differ from each other in terms of at least one material property. If at least one of the mentioned regions has a recess, the plastics material can be arranged in it and thus can also be arranged at the region.

As the at least one material property of the plastics material to be used for the at least one layer made of plastics material, a kind of plastics material and thus a chemical composition of the plastics material, a spring hardness or spring rate and/or an elasticity or an elasticity modulus of the plastics material, a coefficient of friction of the plastics material, and a thickness of the layer is or are taken into consideration and thus chosen and/or adjusted. The layers of plastics material bonded to different regions of the surface of the main body made of plastics material differ at least in terms of the kind or composition of the plastics material, and thus, as a rule, in terms of the coefficient of friction thereof and/or the spring hardness or spring rate thereof, as well as, in an embodiment, in terms of the thickness of the respective layer.

In an embodiment, the at least one region is processed before the casting mold is arranged at it and/or on it. This is provided, for example, when the plastics material of the main body differs from the plastics material to be applied to it in terms of at least one material property, for example. In this case, it is provided that the at least one region is roughened, for example. Alternatively or additionally, a bonding agent is applied initially to the at least one region, which, if need be, has been roughened, before the layer made of plastics material is applied. It is possible here that the at least one region is initially machined with removal of material and is thus is roughened.

Regardless of whether the at least one region is roughened, it is possible to apply to it a bonding agent that is formed, for example, as an adhesive or solvent, as a result of which different types of plastics material can be connected to one another.

Furthermore, the main body for the first mold element is also cast using, for example, a near-net-shape casting mold.

Moreover, a second mold element is provided as a counter mold or counter piece to the first mold element and, as a rule, is formed from metal, in particular from steel, and has a zero geometry in order to ensure a high dimensional tolerance. In an embodiment, this second mold element can also be cast using a casting mold. Alternatively, it is also conceivable that the second mold element is also formed from plastics material or from metal and plastics material. In this case, it is possible for at least the main body of the second mold element to be cast, as in the case of the first mold element made of plastics material. On the surface of the main body of the second mold element, it is then possible, as in the case of the first mold element, also to apply at least one layer made of plastics material having at least one material property by means of a casting method using a casting mold. However, in order to produce the second mold element on a main body made of metal, it is also possible to apply at least one layer of plastics material.

In one possible embodiment of the method, it is provided that the plastics material is applied to the at least one flat region of the surface of the main body.

In another alternative or additional embodiment of the method, plastics material is initially removed at the at least one region of the surface of the main body and a recess or pocket is formed, wherein, at the at least one region of the surface of the main body, the at least one casting mold is arranged, wherein the at least one casting mold and the recess of the at least one region of the surface enclose the at least one cavity, wherein plastics material is filled into the at least one cavity and cured, wherein the plastics material is connected at the at least one region to the surface of the main body and is introduced into the recess, forming the layer.

It is thus possible to arrange the plastics material on a region of the original surface, such as, for example, a smooth, even, and/or flat region of the original surface, with the layer of plastics material applied thereto forming an elevation on the original surface. If the plastics material is arranged in the recess of the surface, the layer made of plastics material is introduced into the recess, resulting in the formation of a smooth surface, which, in regions, is composed of different plastics materials.

The metal machining tool according to the invention comprises a first mold element and a second mold element, wherein at least the first mold element is or will be produced by an embodiment of the method according to the invention.

As a rule, this metal machining tool is designed for machining a workpiece made of metal.

For this purpose, the workpiece to be processed is arranged between the first mold element made of plastics material, on which at least one layer of plastics material having at least one material property is applied, and the second mold element, wherein the two mold elements are to be pressed against each other, as a result of which the workpiece is to be machined and/or fixed by the two mold elements. In an embodiment, a form of the workpiece to be machined is influenced and/or determined by the second mold element.

The first mold element of the metal machining tool is configured, as already mentioned above, as a holding-down means.

For the production of the first mold element and thus of the holding-down means for the metal machining tool, the main body made of plastics material is provided, wherein the at least one region on the one surface of the main body is treated by a surface treatment measure, wherein, on the at least one processed and/or treated region, the layer made of plastics material that has the at least one material property is applied.

The metal machining tool is designed for the processing of structural parts or workpieces that, for example, are composed of sheet metal, for which reason the metal machining tool is also to be referred to as a sheet metal machining tool and/or is designed as such. In an embodiment, the metal machining tool is designed as a forming tool and/or as a cutting tool.

Usually, the plastics material is adhesively attached via the bonding agent to the at least one region or section of the main body.

At and/or on the region of the surface of the main body, the at least one casting mold is arranged, wherein the at least one casting mold and the at least one processed region of the surface enclose at least one cavity, which forms a negative mold for the plastics material to be applied to the processed section and thus the layer that is thereby to be provided. Liquid plastics material is filled into the at least one cavity and cured, wherein the plastics material is connected to the surface of the main body at/on the at least one processed region and is arranged on it or is bonded to it, forming the layer.

As a rule, the at least one region undergoes material removal during processing and is thus roughened. In an embodiment, the at least one region is milled and thus undergoes material removal.

As further components of the metal machining tool, besides the first mold element or the holding-down means, a second mold element is provided, which is configured as a counter piece to the first mold element. Thus, at a surface, this second mold element has at least one recess, which corresponds to the at least one layer on the surface of the first mold element. As a rule, the surfaces of the two mold elements are complementary in form to each other.

It is thus possible to produce at least the first mold element and, if need be, both mold elements, which are made of plastics material, from a cast material, for example, instead of from a metal material. Thus, in comparison to a tool made of metal, the machining tool has a smaller mass and hence can be operated also at higher stroke speeds, as a result of which negative consequences due to dynamic effects can be reduced or eliminated in the metal machining tool during machining of the workpiece.

The main body for the first mold element is to be produced, as a rule, from a homogeneous plastics material. The main body for the second mold element preferably can be made from a homogeneous metal, in particular from steel, or alternatively from a homogeneous plastics material. The use of a plastics material for at least the first mold element results in a reduction in the material removal time on account of higher machining speeds. Moreover, for the production of the metal machining tool, fewer manual actions, such as, for example, an additional processing and/or initial processing, are required. The metal machining tool can be simply retrofitted and, as necessary, refitted for material removal. On the surface of the first mold element, differences in an effective surface area are deliberately created locally by different plastics materials. Furthermore, the metal machining tool is easy to modify. Moreover, it is possible to attach to it other components for the metal machining tool that are designed as standard parts. Moreover, mold elements made of plastics material have good damping properties. In an embodiment, the second mold element is at least partially formed, for example, from metal and plastics material or is completely formed from metal. If the second mold element is formed from metal, it can have a zero geometry, as a result of which a dimensional tolerance of a workpiece that is formed from sheet metal, for example, is to be ensured.

The metal machining tool, such as, for example, a forming tool and/or a cutting tool, is to be produced through an embodiment of the presented method and is designed for machining—for example, for forming—a workpiece or structural part.

The metal machining tool comprises, as a holding-down means, the first mold element with the main body made of plastics material, the surface of which is subdivided into a plurality of regions, wherein, on at least one region, a layer made of plastics material, which has at least one material property, is applied and is thus bonded. The second mold element of the metal machining tool is configured as a counter piece to the first mold element.

In an embodiment, the metal machining tool is designed for forming a workpiece or structural part from metal, wherein the workpiece or structural part to be formed, is formed, as a rule, as a sheet metal or is to be designated as such.

During an operation of the metal machining tool, the workpiece to be formed is to be arranged between the first mold element or the holding-down means made of plastics material, on which at least one layer of plastics material with at least one material property is applied, and the second mold element. The two mold elements are to be forced and/or pressed against each other, as a result of which the workpiece is to be formed and/or fixed, that is, by the two mold elements or between the two mold elements.

In comparison to a conventional metal machining tool, the two mold elements of which are formed, as a rule, completely from metal, the provision of at least one layer made of plastics material having at least one material property increases the coefficient of friction or frictional coefficient in that region of the surface of the first mold element, on which the at least one layer made of plastics material is applied, and the structural part made of metal, whereas a coefficient of friction between two parts made of metal is, as a rule, smaller. Thus, when the metal machining tool is utilized, a normal force or holding-down force, which is to be applied between the two mold elements during forming of the structural part, can be reduced, given a constant holding-down force or retention force. Through reduction of the holding-down force, the structural part is not deformed or plasticized by the at least one layer made of plastics material. Furthermore, tensile forces that otherwise occur with the metal machining tool during a metal machining method, such as cutting, deforming, and/or stamping, are diminished, as a result of which it is also possible to prevent any warping of the structural part or to prevent surface flaws in the formed structural part. Moreover, it is possible to enlarge a process window for the machining, because a required holding-down force is smaller and, accordingly, it is also possible to utilize a press with a smaller force.

Through specific definition of the at least one region on the surface of the first mold element or of the holding-down means, it is possible through selection of the at least one material property of the plastics material and/or through selection of the thickness of the layer between the at least one region, on which the at least one layer of plastics material is bonded, and at least one other region of the surface of the first mold element to achieve variable load-bearing ratios for the structural part being formed. The surface of the first mold element makes it possible to prevent any sagging of the usually plate-shaped structural part during forming. A distribution of a force between the surface of the first mold element and the structural part can be controlled by, among other things, the height or thickness of the layer made of plastics material, a shape of the surface area of the at least one region coated with plastics material, and a kind or type and/or composition of the plastics material.

Usually, at least the first of the two mold elements is coated with plastics material. The second mold element forms a counter geometry to the first mold element coated with plastics material, wherein, in this way, a high dimensional accuracy of the structural part to be formed is to be ensured. If the second mold element is also formed from a plastics material or has at least one layer made of plastics material, it is possible that, for the first mold element, at least a plastics material that differs from a plastics material for the second mold element is used. In an embodiment, during the production of the first mold element, at least one defined region on the surface of the main body is coarsely milled and thus roughened. Afterwards, the at least one roughened region is coated with the bonding agent, such as, for example, an adhesion promoter, with the bonding agent being applied to the at least one region that has previously been roughened.

Through utilization of the casting mold, which is arranged on the at least one processed region of the main body of the first mold element, with at least one cavity being situated between the casting mold and the at least one region on the surface of the main body, liquid plastics material is introduced into the at least one cavity and thus cast on the surface in a near-net shape manner, wherein, here, through the choice of a geometry of the layer made of plastics material, it is possible—for example, in order to prevent any shrinkage or inaccuracy—to provide a defined structure or a defined measurement of the surface of the first mold element.

In this case, the casting mold forms, together with the already previously processed main body made of plastics material, a negative mold for the at least one additional layer made of plastics material. In accordance herewith, the main body also serves as a casting mold and or forming die for at least one layer made of plastics material. During the processing of the main body made of plastics material, it is possible, through a degree of roughening, to improve a bonding of the plastics material being applied to the main body.

With the metal machining tool produced by the method, it is possible, among other things, to produce a sheet metal as a structural part that is to be machined and that has a largely constant thickness, which varies only slightly. Moreover, any spotting effort can be reduced. Through provision of the at least one layer made of plastics material, tribological conditions can be adjusted in a targeted way, for example, by an increase in friction as well as a reduction in a required holding-down force. Furthermore, depending on functions and processes on the effective surface of the first mold element, variable load-bearing ratios can be provided. During the production of the metal machining tool and/or during the utilization thereof, it is possible to dispense with the otherwise conventional tools or structural parts made of sheet metal. Furthermore, the first mold element can be processed in an accelerated manner.

Further advantages and embodiments of the invention ensue from the description and the appended drawings.

It is understood that the features that have been previously mentioned and those that are yet to be explained below can be used not only in the respectively given combination, but also in other combinations or alone, without leaving the scope of the present invention.

BRIEF DESCRIPTION OF THE DRAWING

The invention is illustrated schematically on the basis of embodiments in the drawings and will be described schematically in detail with reference to the drawings.

DETAILED DESCRIPTION

The figures will be described in connection with each other and in an overarching manner; identical components are assigned the same reference numbers.

On the basis of FIGS. 1a, 1b, 1c, and 1d, it is illustrated schematically how, when the embodiment of the method according to the invention is implemented, a first mold element 4 is produced from a main body 2 made of at least one first plastics material as a component of the embodiment of the metal machining tool 6 according to the invention. In this case, it is provided that the first mold element 4 to be produced is configured as a holding-down means of the metal machining tool 6 and/or is to be used as such. It is provided here that the main body 2 is produced by carrying out a casting method using a casting mold. This first mold element 4 is to be configured, for example, as a holding-down means and/or is to be referred to as such.

Figure 1:
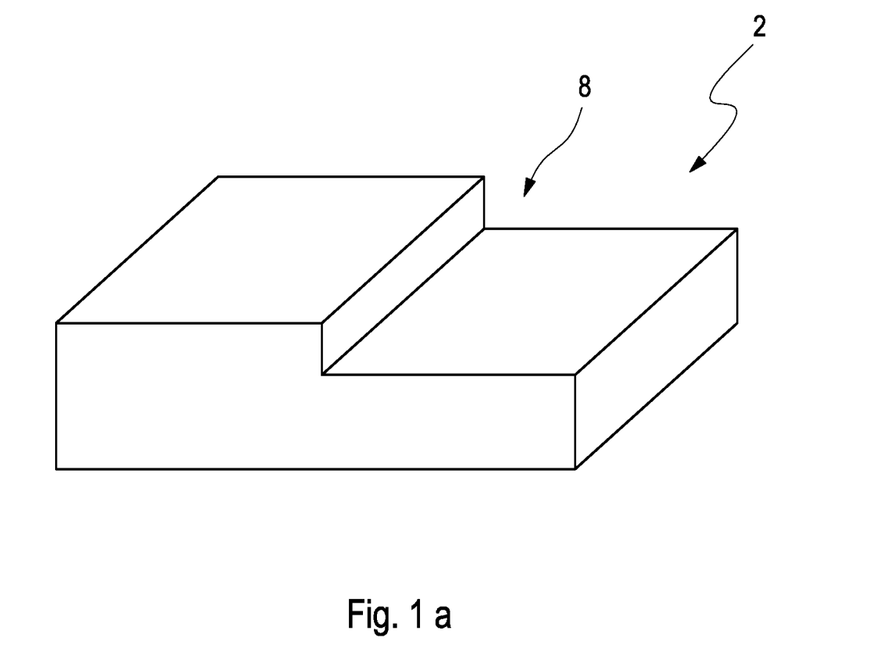
FIG. 1 shows, in schematic illustration, steps of an embodiment of the method according to the invention, in which a first embodiment of the metal machining tool according to the invention is produced.

Furthermore, on an original surface 8 of the main body 2, at least one region 10, 12—here, two regions or surface areas 10, 12—is chosen, on which, in the scope of the method, in each case, a layer 14, 16 made of at least one second plastics material is to be applied or is to be bonded. In this case, for each of the two regions 10, 12 on the surface 8, a surface treatment measure is carried out. A first region—here, even or flat region 10—which is provided for a first layer 14, is situated in this case directly at and/or on the surface 8. In a second region 12 of the surface 8, plastics material is initially removed and a recess 13 or depression and/or pocket is formed at the originally flat or smooth surface 8: the second layer 16 is arranged in this case at or on the second region 12 of the surface 8 in the recess 13.

Here, each region 10, 12 is roughened and a bonding agent is applied to the roughened regions 10, 12 (FIG. 1b). In a further step (FIG. 1c), it is provided that, on the surface of the main body 2, a casting mold 18 is arranged.

Figure 1C:
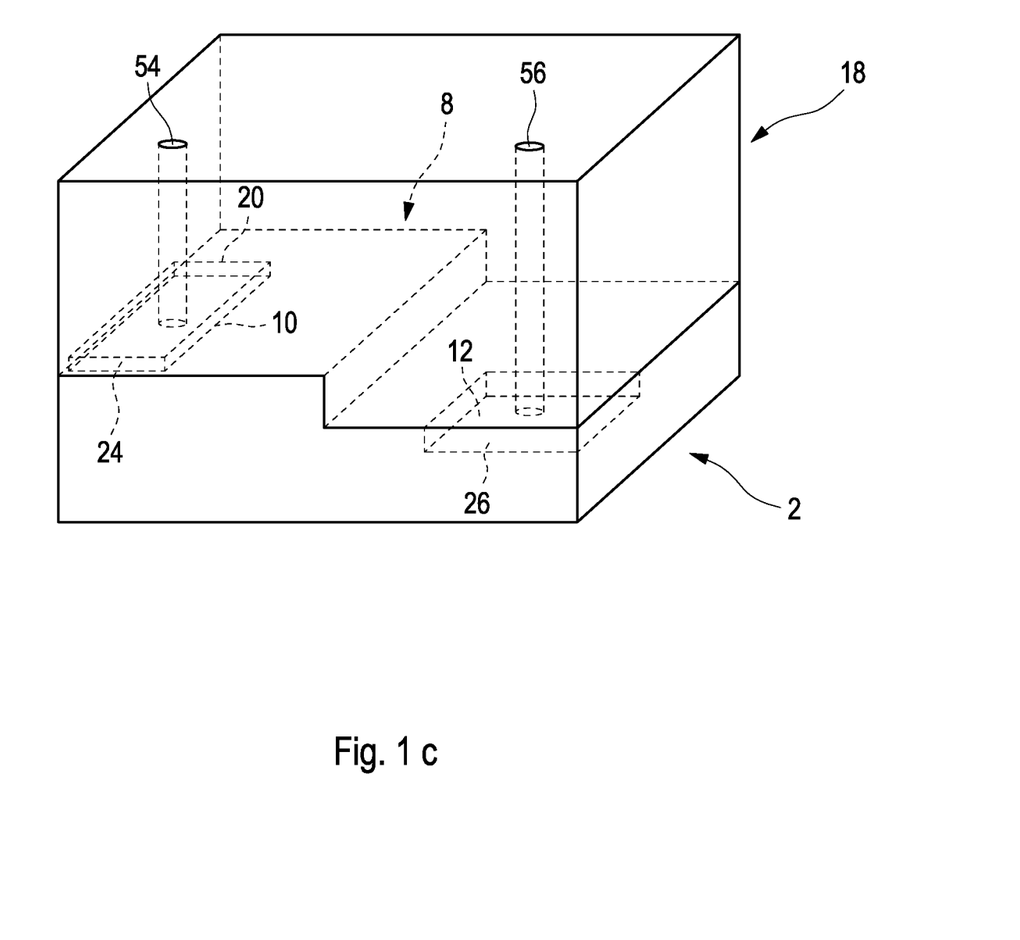

In this case, the casting mold 18 comprises a recess 20, which is assigned to the first—here, flat—region 10 on the surface 8 of the main body 2. Furthermore, it is provided that the first region 10 on the surface 8 of the main body 2 and the recess 20 enclose a first cavity 24. Moreover, a first channel 54, which extends inside of the casting mold 18, is assigned to the recess 20 and thus to the first cavity 24.

A second even, flat, and/or smooth region of a surface of the casting mold 18 is assigned to the second region 12 and thus to the recess 13 at and/or on the surface 8 of the main body 2. The second region 12 with the recess 13 in the surface 8 of the main body 2 and the surface of the casting mold 18 enclose a second cavity 26. Assigned to the second cavity 26 and/or to the recess 13 at the surface 8 of the main body 2 in this case is a channel 56, which extends inside of the casting mold 18.

Furthermore, at least one second plastics material in liquid form is filled into the two cavities 24, 26 through the channels 54, 56. In this case, it is conceivable that a first kind or type of plastics material is filled into the first cavity 24 and a second kind or type of plastics material is filled into the second cavity 26, with one or both kinds of plastics material differing, as a rule, from the first plastics material of the main body. Accordingly, it is possible to use different plastics materials, which have different material properties and different chemical compositions and/or properties. The plastics materials cure inside of the cavities 24, 26.

Formed on the first region 10 is the first layer 14 made of the first kind of plastics material, which is bonded to the roughened region 10 of the main body 8 that is furnished with the bonding agent. In this case, the first layer 14 made of the first kind plastics material comprises a first thickness or height, a first coefficient of friction, and a first spring hardness or spring rate.

Furthermore, the second layer 16 made of the second kind of plastics material is bonded on the second region 12 of the surface 8 and/or in the recess 13 arranged there, wherein, here, this second layer 16 has a second thickness or height, a second coefficient of friction, and a second spring hardness or spring rate, which, in each case, may differ from the first thickness, the first coefficient of friction, and the first spring hardness or spring rate of the first layer 14.

A thickness of a particular layer 14, 16 is defined, in a first step, by a height and/or depth of a respective recess. In this case, the thickness is defined by the depth of the recess 20 of the casting mold 18, which is arranged on the flat region 10 of the surface 8, and by the depth of the recess 13 at the second region 12 of the surface 8, on which a flat region of the casting mold 18 is arranged, with a cavity 24, 26 being provided in each case. Another possibility for controlling the thickness is to control the amount of the respective plastics material to be filled through the respective channel 54, 56, which, however, in both cases, can be altered for fine adjustment in a second step by post-processing, if necessary.

Figure 1D:
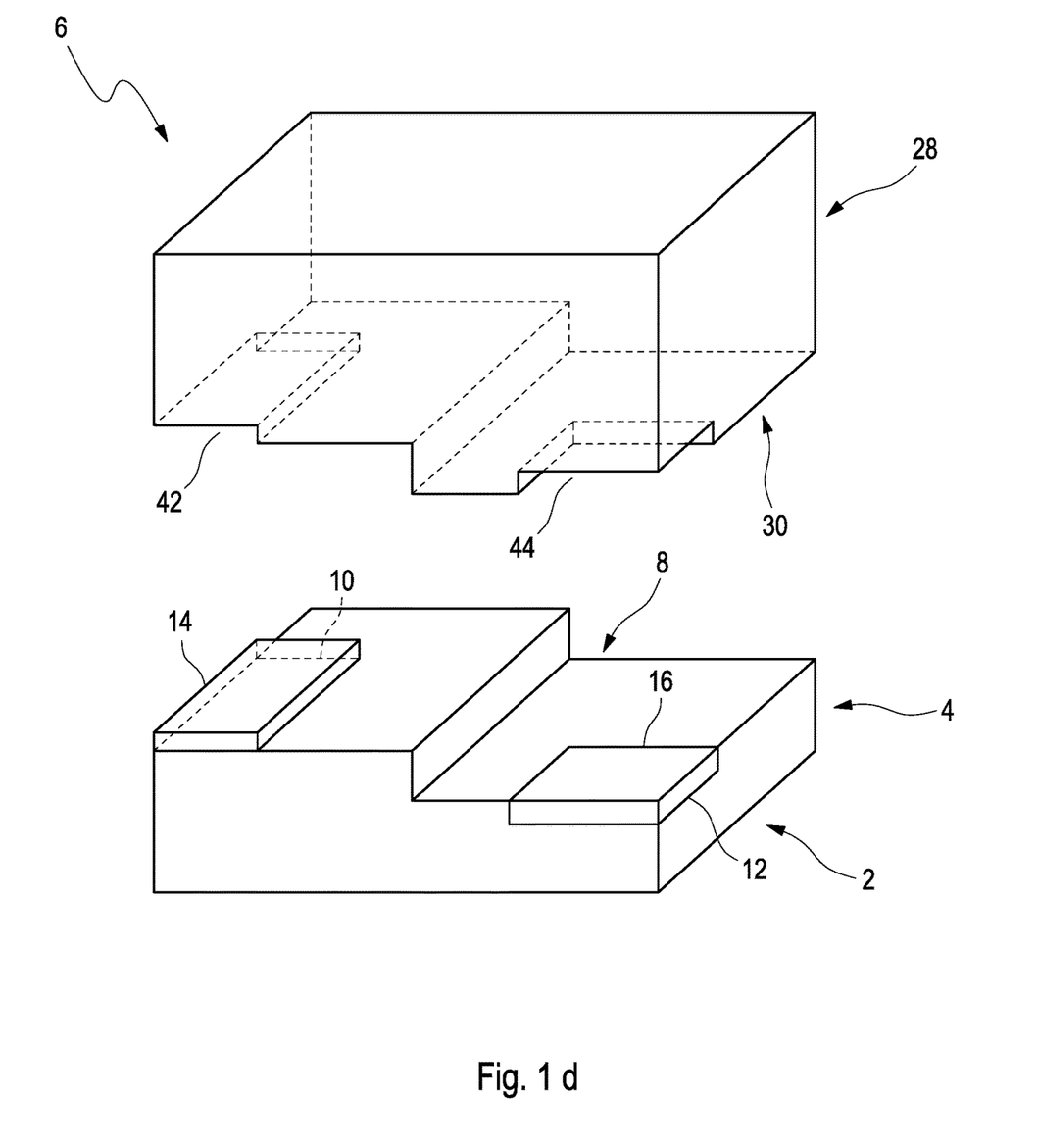

Through bonding of the two layers 14, 16 to the regions 10, 12 of the surface 8, the first mold element 4 and thus the holding-down means of the metal machining tool 6 are formed from the main body 2. FIG. 1d also shows a second mold element 28 as another component of the metal machining tool 6. In this case, said second mold element 28 has a surface 30, which is complementary in shape to the surface 8 of the main body 2 with the layers 14, 16 made of the first plastics material bonded to it. The second mold element 28 here has two recesses 42, 44, which are complementary in shape to the layers 14, 16 made of the at least second plastics material on the surface 8 of the first mold element 4.

For forming a structural part from metal, usually from sheet metal, said metal is to be arranged between the two mold elements 4, 28 of the metal machining tool 6.

Afterwards, the two mold elements 4, 28 are to be moved toward each other, whereby the structural part is pressed between the mold elements 4, 28.

Figure 2:
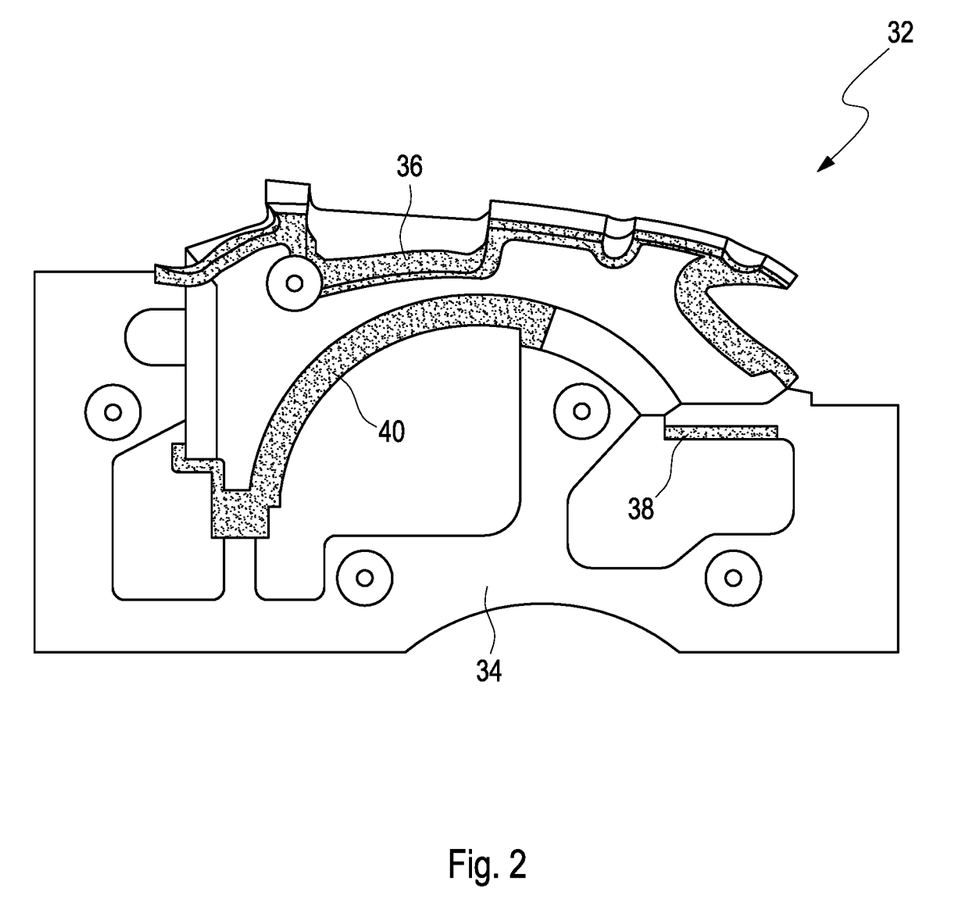
FIG. 2 shows, in schematic illustration, a detail of a second embodiment of the metal machining tool according to the invention.

FIG. 2 shows another example for a first mold element 32 as a component of the second embodiment of the metal machining tool according to the invention. This first mold element 32 is also configured as a holding-down means and has a main body 34 made of plastics material, to which, here, a plurality of layers 36, 38, 44* made of different kinds of plastics material having different thicknesses are bonded.

The presented first mold elements 4, 32 of the metal machining tool are configured as a holding-down means in order to control a material flow for a structural part to be processed, wherein a warping, a formation of creases, and/or a crumpling of the structural part is prevented by the holding-down means.

The invention claimed is:

1. A method comprising:
   providing a main body, wherein a surface of the main body is subdivided into a plurality of regions;
   arranging, on at least one region of the surface of the main body, at least one casting mold, wherein the at least one casting mold and the at least one region of the surface of the main body enclose at least one cavity;
   applying a layer of plastics material to the at least one region, wherein the layer of the plastics material is filled into the at least one cavity and cured;
   applying the layer of the plastics material in the at least one region to the surface of the main body, thereby forming a first mold element for a metal machining tool.

2. The method according to claim 1, further comprising:
   applying a plurality of layers of plastics material, which differ from each other in terms of at least one material property, on at least two different regions of the surface of the main body.

3. The method according to claim 1, wherein the plastics material has at least one material property, wherein the at least one material property is at least one of a spring hardness of the plastics material, a spring rate of the plastics material, a n elasticity modulus of the plastics material, a coefficient of friction of the plastics material, and a thickness of the layer of the plastics material.

4. The method according to claim 1, further comprising:
   processing the at least one region before arranging the at least one casting mold.

5. The method according to claim 1, further comprising:
   casting the main body using the at least one casting mold.

6. The method according to claim 1, further comprising:
   providing a second mold element made of steel that is configured as a counter piece to the first mold element.

7. The method according to claim 1, further comprising:
   applying the plastics material to the at least one region of the surface of the main body.

8. The method according to claim 1, further comprising:
   in the at least one region of the surface of the main body, removing the plastics material to form a recess; wherein the at least one casting mold and the recess at the at least one region of the surface enclose the at least one cavity;
   filling the plastics material into the at least one cavity; and
   curing the filled plastics material, wherein the cured plastics material is connected to the surface of the main body.

9. The method according to claim 2, wherein the plastics material has at least one material property, wherein the at least one material property is at least one of a spring hardness of the plastics material, a spring rate of the plastics material, an elasticity modulus of the plastics material, a coefficient of friction of the plastics material, and a thickness of the layer of the plastics material.

* * * * *